Figure 1:
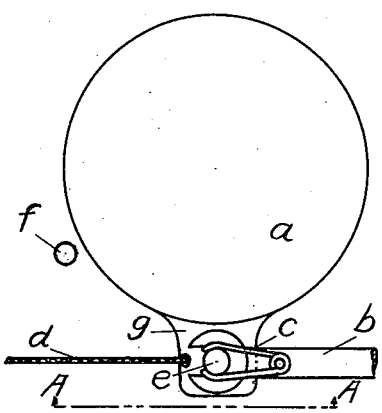

E. FAVARY.
SAFETY DEVICE FOR AUTOMOBILES.
APPLICATION FILED AUG. 22, 1907.

1,087,485.

Patented Feb. 17, 1914.
2 SHEETS—SHEET 1.

WITNESSES:
Roger B. Whitman
Monroe S. Gilmer

INVENTOR
Ethelbert Favary

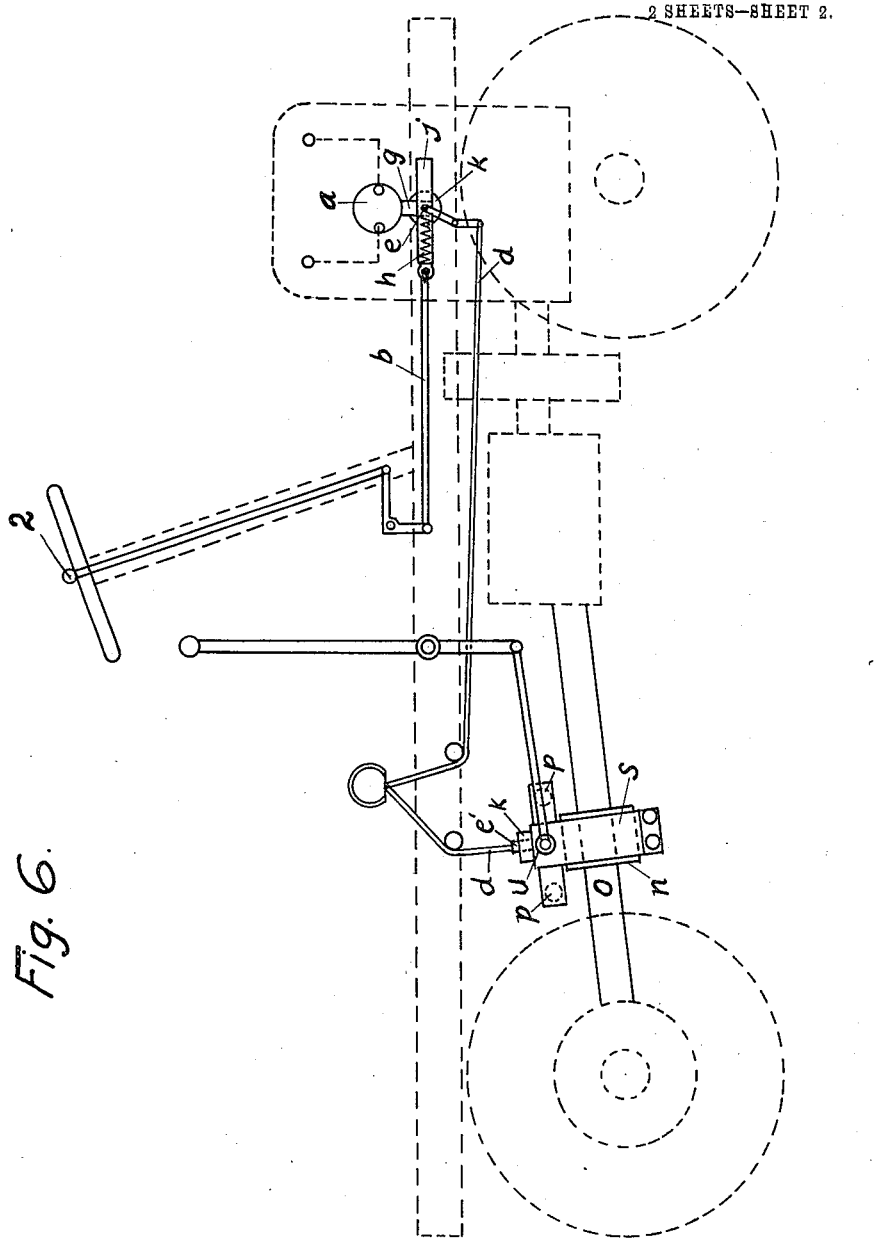

UNITED STATES PATENT OFFICE.

ETHELBERT FAVARY, OF NEW YORK, N. Y.

SAFETY DEVICE FOR AUTOMOBILES.

1,087,485.  Specification of Letters Patent.  Patented Feb. 17, 1914.

Application filed August 22, 1907. Serial No. 389,704.

*To all whom it may concern:*

Be it known that I, ETHELBERT FAVARY, citizen of Austria-Hungary, and resident of New York, in the county of New York and State of New York, have invented certain new and useful Improvements in Safety Devices for Automobiles, of which the following is a specification.

This invention comprehends certain new and useful improvements in means, controllable independently of the chauffeur on the driver's seat, for bringing the automobile to a standstill in any case of emergency, as for instance should the chauffeur lose his presence of mind.

At the present day, the only means provided for stopping an automobile is under the sole control of the chauffeur and embodies devices whereby the brakes are applied by hand or foot and devices whereby the connection between the engine and the driving wheels of the automobile may be broken, as by operating a foot actuated clutch lever. In order to promptly stop the automobile, it is necessary for the chauffeur to operate both of these devices substantially simultaneously, for if the brakes alone are applied, without breaking the connection between the engine and the driving wheels of the vehicle, the machine might not be brought to a standstill, unless the engine should be "choked". In other words, if the chauffeur should lose his presence of mind, if something should go wrong with the clutch lever so as to make it impossible to disconnect the engine quickly from the driving wheels, if the steering wheels should not act promptly, and the chauffeur in trying to control them, should lose sight of everything else, or if the automobile should start for any reason whatever when the chauffeur is not in his seat, an accident would be imminent for the reason that the passengers, with the exception of the chauffeur are in a position where they may not conveniently reach the brake levers or the other devices provided for actuating the brakes and disconnecting the engine from the driving wheels.

With a knowledge of these conditions, my invention has for its primary object, improved safety devices which will enable passengers riding in an automobile to stop the same independently of the chauffeur and of the means ordinarily provided for him to control the car, and more specifically the invention aims to provide means whereby the passengers, by touching a button, pulling a knob or handle, or moving a lever slightly and without the necessity of exerting much force as is required with the present clutches and brake levers, may quickly bring the automobile to a standstill.

With these and other objects in view as will more fully appear as the description proceeds, the invention consists in certain constructions, arrangements and combinations of the parts that I shall hereinafter fully describe and claim.

Figure 2:
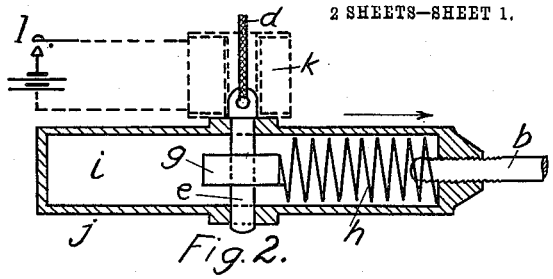
Figure 3:
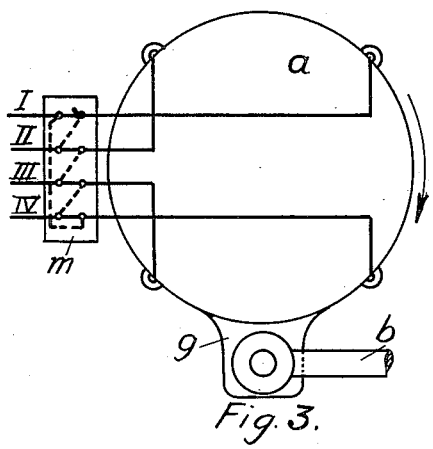
Figure 4:
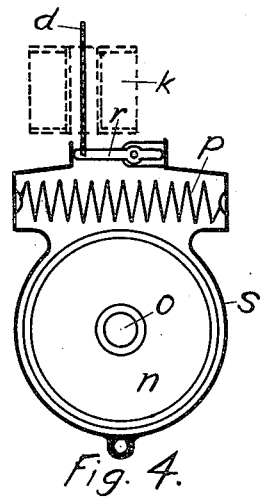
Figure 5:
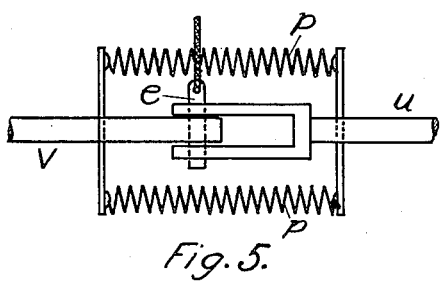

For a full understanding of the invention, reference is to be had to the following description and accompanying drawings, in which:

Figure 1 is a side elevation of one embodiment of my invention; Fig. 2 is a horizontal sectional view of another form of the device; Fig. 3 illustrates in side view still another form; Fig. 4 is a detail side view of a passenger controlled brake actuating safety-device that may be employed, and Fig. 5 is a detail view of another form of brake actuating safety device; Fig. 6 shows the parts assembled on an automobile.

Corresponding and like parts are referred to in the following description and indicated in all the views of the drawings by the same reference characters.

Those forms of my invention illustrated in Figs. 1, 2, and 3 are designed to act on the well known principle that if an internal combustion engine is running and the spark be advanced too much, it will stop the engine and that if the ignition of the engine be advanced so as to occur at the beginning of the compression stroke, not only will the engine be stopped, but the compression of the gas in the cylinders will offer considerable resistance to the movement of the pistons, which will result in bringing the automobile quickly to a standstill.

Referring now to the drawings and more particularly to Figs. 1, 2 and 3, the reference numeral *a* designates the commutator which is usually attached to a shaft running at one-half the speed of the engine or to the magneto.

*b* designates a rod forming part of the ordinary means for controlling the commutator and ignition from the driver's seat by the chauffeur, said rod being designed to be connected in the usual manner with the spark advancing and retarding lever as shown at 2, Fig. 6.

$c$ designates a spring which is fastened to the rod $b$ and which is so arranged that under normal conditions it will operatively maintain in connection the commutator $a$ and the rod $b$.

$d$ designates any flexible connection which can be reached by all of the passengers of the automobile and which may be any kind of a rope, chain, or if desired, a rod. The lug of the commutator $a$ is formed with a pin $e$ which is directly engaged by the connecting spring $c$. It will thus be understood that under ordinary conditions, the commutator $a$ is controlled by the movements of the rod $b$, the spring $c$ being of sufficient tension to at all times hold, under normal conditions, the rod $b$ connected to the pin $e$ of the lug $g$. But in case it is required to stop the automobile quickly, it is evident that a pull upon the safety actuating device $d$ will disengage the pin $e$ from the spring $c$, and consequently also from the rod $b$, whereby the commutator $a$ is moved until the lug $g$ engages a relatively stationary stop $f$. Manifestly, if this stop be placed so that it will engage the lug $g$ of the commutator $a$ when the latter is in a position where ignition will occur in the cylinder at the commencement of the compression stroke, it will require a great deal of power to rotate the crank shaft of the engine and consequently the engine will serve to check the momentum of the vehicle. Instead of having to pull the commutator out of connection with the rod $b$, I may use a construction such as that illustrated in Fig. 2. This view is a sectional view, taken on a line which is indicated by A—A in Fig. 1, were the parts of Fig. 1 to be arranged as illustrated in Fig. 2. In this last named embodiment of the invention, $h$ designates a spring which under normal conditions is held compressed by a pin $e$ which engages the lug $g$ of the commutator $a$, said lug bearing against one end of the spring $h$, as clearly shown. In this form of the device, if it be desired to stop the car, the rope $d$ is pulled, and this in turn will pull the pin $e$, thereby releasing the spring $h$, the latter being permitted to act to move the commutator lug $g$ in a direction to turn the commutator toward the position in which ignition will occur in the cylinder at the commencement of the compression stroke. The housing $j$ is provided for this form of the device, said housing being in the form of a tube, if desired, slotted at one side to permit the lug $g$ to slide inward.

If desired, instead of pulling the pin $e$ by the safety actuating device $d$, I may provide an electro-magnet $k$ of which the pin $e$ constitutes a movable plunger or core. Then by closing the electrical connection as by a push button $l$ the electro-magnet will be energized and the pin $e$ will be moved into it so as to release the lug $g$. Obviously, the electric current necessary for this electro-magnet may be taken from the battery or magneto used for the ignition of the gas in the engine cylinder, or from a separate battery. Instead of advancing the commutator, I may use an electric switch by which it is possible to change the electric connection between the leads or wires going to the spark coil or the different cylinders, and the terminals of the commutator. For instance, referring now to Fig. 3, if the arrow shows the direction for advancing the commutator and the electric switch $m$ be so arranged that by any means such as moving a knob or handle, the connections will be changed as shown in dotted lines, it can readily be understood that the explosion in the respective cylinders will occur earlier than under ordinary circumstances, and thus have the same effect as if the commutator were advanced.

I, II, III and IV are the wires going to the spark coils of the cylinders. It is to be understood that this part of my invention is not limited to any specific location or number of switch handles or knobs arranged in different parts of the automobile so that the passengers riding in the rear as well as those in front, including the chauffeur, may reach them easily.

The device thus far described will tend to stop the automobile if the connection between the engine and the driving wheels be uninterrupted. If, however, the chauffeur should disengage the clutch or if in any other way this connection be broken, it is clear that advancing the commutator would instantly stop the engine, but not the automobile. For this reason, I provide, in addition to the commutator controlling means and designed to be installed in an automobile in connection therewith, some means under the control of the passengers for operating the brakes. One embodiment of this means is illustrated in Fig. 4, where $n$ designates a brake pulley fastened upon the rotating shaft $o$ of the automobile. If convenient, the driving shaft might be employed which always rotates when the wheels of the automobile are rotating. A spring $p$ is held under tension by a trigger $r$ to which the safety actuating device $d$, such as a rope, cable or the like is connected. Under ordinary conditions, with the parts in the position illustrated in Fig. 4, the spring $p$ will hold the brake-band $s$ out of engagement with the brake pulley $n$. But when it is desired to bring the devices into operation, it is only necessary to pull the trigger $r$ in a direction to release its relatively free end from the adjoining portion of the brake band, whereupon the spring $p$ will be permitted to act and draw the brakeband tightly around the pulley. If desired, an electro-magnet coil $k$ may be employed to pull the trigger $r$, in which case the electric circuit for the electro-magnet may be the same as that described in connection with Fig. 2, whereby the actuation of a single push button will not only stop the engine, but apply the brake.

Instead of using a separate brake as indicated in Fig. 4, I may use one of the ordinary brakes of the car, the parts being then arranged as indicated in Fig. 5. In this view, $u$ designates the brake rod, leading from the brake hand lever or foot lever, and $v$ designates the rod leading to the rear wheel brakes or the shaft brake. These two parts are ordinarily connected rigidly by means of the pin $e$, and when they are so connected, the springs $p$ that are connected to the respective rods $u$ and $v$ are held under tension. In this embodiment of the invention, when it is desired to bring the safety brake devices into action, it is only necessary to withdraw the pin $e$, whereupon the rigid connection between the two rods $u$ and $v$ will be broken and the contractile springs would be permitted to act so as to apply the brake.

Having thus described the invention, what is claimed as new is:

1. In an automobile, a commutator, chauffeur controlled means for actuating the same, said means including a rod having a frangible connection with the commutator, automatic means tending to actuate the commutator independently of the chauffeur controlled means, and means for breaking the connection between said rod and the commutator, whereby to permit said automatic means to act.

2. In an automobile, a commutator, chauffeur controlled means for actuating the same, said means including a rod having a frangible connection with the commutator, electrically controlled means for breaking said connection, and means for automatically actuating the commutator when said connection has been broken.

3. In an automobile, a commutator, and chauffeur controlled means for actuating the same, said means including a rod having a connection with the commutator, and independent means arranged to break the connection between said rod and commutator.

4. In an automobile, the combination with a commutator, and a brake, of chauffeur controlled means for operating the commutator, means for applying the brake, and means controlled by the passengers and auxiliary to the first-named means for advancing the ignition and applying the brake.

5. In an automobile, a commutator provided with a lug, a rod, a tube connected to said rod and in which the lug of the commutator is mounted, a pin extending into said tube and lug, means for withdrawing said pin, and a spring pressing against said lug and tending to move it in a direction to advance the spark.

6. In an automobile, the combination with a commutator and a brake, of chauffeur controlled means for operating the commutator, means for automatically applying the brake, means for holding said automatic applying means in an operative position, and means arranged to be controlled by the passengers for operating the commutator and releasing said holding means to permit the automatic means to act.

Signed at New York in the county of New York and State of New York this twenty-first day of August A. D. 1907.

ETHELBERT FAVARY.

Witnesses:
 ROGER B. WHITMAN,
 M. S. GILMER.